US012223014B2

United States Patent
Xiong et al.

(10) Patent No.: US 12,223,014 B2
(45) Date of Patent: Feb. 11, 2025

(54) DATA COLLECTION AND USER FEEDBACK IN EDGE VIDEO DEVICES

(71) Applicant: Western Digital Technologies, Inc., San Jose, CA (US)

(72) Inventors: Shaomin Xiong, Freemont, CA (US); Toshiki Hirano, San Jose, CA (US); Damien Kah, San Jose, CA (US); Rajeev Nagabhirava, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/516,188

(22) Filed: Nov. 1, 2021

(65) Prior Publication Data
US 2023/0133832 A1    May 4, 2023

(51) Int. Cl.
*G06T 7/20*    (2017.01)
*G06F 18/21*    (2023.01)
*G06V 20/40*    (2022.01)

(52) U.S. Cl.
CPC ........ *G06F 18/217* (2023.01); *G06F 18/2163* (2023.01); *G06T 7/20* (2013.01);
(Continued)

(58) Field of Classification Search
CPC ............... G06F 18/217; G06F 18/2178; G06F 18/2163; G06F 18/00; G06V 20/40–49;
(Continued)

(56) References Cited

U.S. PATENT DOCUMENTS

| 10,628,961 | B2 | 4/2020 | Sundaresan et al. |
| 10,762,644 | B1 | 9/2020 | Mahadevan et al. |

(Continued)

FOREIGN PATENT DOCUMENTS

| CN | 110555870 |   | 12/2019 |   |
| CN | 110555870 | A * | 12/2019 | ........... G06K 9/6256 |
| JP | WO2014155639 | A1 * | 8/2016 | ............. G06V 20/52 |

OTHER PUBLICATIONS

Yao, Angela, et al. "Interactive object detection." 2012 IEEE conference on computer vision and pattern recognition. IEEE, 2012. (Year: 2012).*

(Continued)

*Primary Examiner* — Vincent Rudolph
*Assistant Examiner* — Meredith Taylor
(74) *Attorney, Agent, or Firm* — Patent Law Works LLP

(57) ABSTRACT

A digital video camera architecture for updating an object identification and tracking model deployed with the camera is disclosed. The invention comprises optics, a processor, a memory, and an artificial intelligence logic which may further comprise artificial neural networks. The architecture identifies objects according to a first confidence threshold of the model and identifies candidate objects according to the first confidence threshold and a second confidence threshold. The model may track the motion of the candidate objects within a visual field, separate the candidate objects into false positive candidate objects and false negative candidate objects according to their tracked motions, and present at least a portion of the false positive candidate objects and false negative candidate objects for further annotation.

20 Claims, 12 Drawing Sheets

(52) U.S. Cl.
CPC .... *G06V 20/40* (2022.01); *G06T 2207/10016* (2013.01); *G06T 2207/20021* (2013.01)

(58) Field of Classification Search
CPC ..... G06V 20/52–54; G06T 7/20; G06T 7/215; G06T 2207/10016; G06T 2207/20021
See application file for complete search history.

(56) References Cited

U.S. PATENT DOCUMENTS

| | | |
|---|---|---|
| 10,964,033 B2 | 3/2021 | Habibian et al. |
| 2019/0130583 A1 | 5/2019 | Chen et al. |
| 2021/0166402 A1 | 6/2021 | Ricco et al. |
| 2021/0232824 A1* | 7/2021 | Shayne .................. G06T 7/001 |

OTHER PUBLICATIONS

Kim, Jae-Hak, and Lourdes Agapito. "Motion segmentation using the Hadamard product and spectral clustering." 2009 Workshop on Motion and Video Computing (WMVC). IEEE, 2009. (Year: 2009).*

P. Liang, H. Ling, E. Blasch, G. Seetharaman, D. Shen and G. Chen, "Vehicle detection in wide area aerial surveillance using Temporal Context," Proceedings of the 16th International Conference on Information Fusion, Istanbul, Turkey, 2013, pp. 181-188. (Year: 2013).*

Kehoe, Ben, et al. "Cloud-based robot grasping with the google object recognition engine." 2013 IEEE International Conference on Robotics and Automation. IEEE, 2013. (Year: 2013).*

Kang, Kai. Intelligent Video Analysis with Deep Learning. The Chinese University of Hong Kong (Hong Kong), 2017. (Year: 2017).*

* cited by examiner

DATA COLLECTION AND USER FEEDBACK IN EDGE VIDEO DEVICES

RELATED APPLICATIONS

This application is related to application Ser. No. 17/515,977, filed on the same day, owned by the same assignee, and is included herein by reference in its entirety.

FIELD

The present disclosure relates to image processing. More particularly, the present disclosure technically relates to efficient training and retraining of artificial neural networks in video data processing in edge video devices.

BACKGROUND

As technology has grown over the last decade, the quantity of time-series data such as video content has increased dramatically. This increase in time-series data has generated a greater demand for automatic object identification and classification. In response, neural networks and other artificial intelligence methods have been increasingly utilized to generate automatic classifications, specific detections, and segmentations. In the case of video processing, computer vision trends have progressively focused on object detection, image classification, and other segmentation tasks to parse semantic meaning from video content. In particular, there is a need to improve the models used for object detection. It is desirable for this process to be automated as much as possible.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
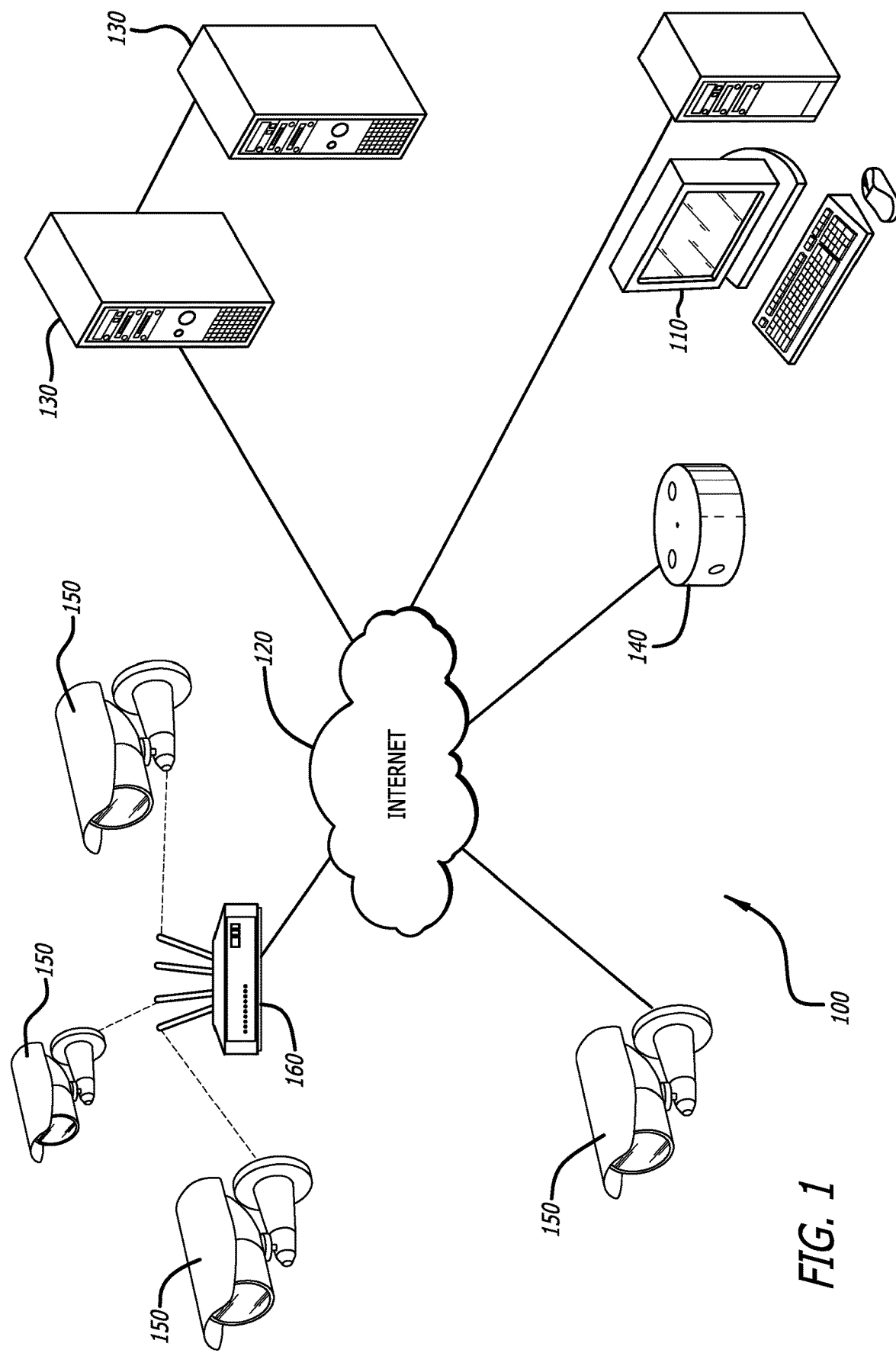
FIG. 1 is a conceptual illustration of a video image data processing system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, systems and methods are discussed herein that describe processes for streamlining the process of updating the models of video image data processing within artificial neural networks and other Artificial Intelligence (AI) techniques. Specifically, systems and methods are presented for the improvement of the models employed by digital video cameras with a minimum of human intervention.

In particular, it may be desirable to increase the certainty with which models detect objects and track their motions. A confidence threshold may be used in the models to differentiate between True Positive (TP) detections (e.g., correct detection of an object), False Positive (FP) detections (e.g., incorrect detections of an object), True Negative (TN) detections (e.g., correct detections of the absence of an object), and False Negative (FN) detections (e.g., incorrect detection of an object that is not present or miss an object that is present). Collecting examples of FP and FN cases may be used to periodically train and update the model In practical applications, digital video cameras may be installed in clusters for purposes of surveillance of an area or areas. A single customer may have multiple installations, and additional customers may increase the installed base even further. The digital video cameras may be coupled to one or more computers which may be (optionally) operated by either the camera owner(s), the camera manufacturer and/or service provider. The amount of stored data may be immense with hundreds of hours of video stored in thousands of cameras in dozens or hundreds of installations worldwide.

In all of that data, there may be mistakes where the model made a FP or FN detection. Ideally, it may be desirable to identify some of these cases to improve the training data used to create the models. Given the volume of data, automation may be necessary to find those errant cases, select some for further annotation. In some embodiments, the further annotation may be performed by a human or a user making a judgement if the FP or FN candidate is really incorrect. In other embodiments, the further annotation may be performed automatically with computational resources greater than available on an individual digital video camera like, for example, a server farm or cloud computing environment with the resources to run a more complex AI and/or have access to a much larger database of annotated images to draw upon. Then the data must be gathered from the user base without querying the users so frequently as to lessen the user experience.

Embodiments of the present disclosure can be utilized in a variety of fields including general video analytics, facial recognition, object segmentation, object detection, autonomous driving, traffic flow detection, drone navigation/operation, stock counting, inventory control, and other automation-based tasks that generate time-series based data. The use of these embodiments can result in fewer required computational resources to produce similarly accurate results compared to a traditional convolutional or other neural network. In this way, more deployment options may become available as computational resources increase and become more readily available on smaller and less expensive electronic devices.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, field-programmable gate arrays ("FPGAs") or other discrete components. A function may also be implemented in programmable hardware devices such as programmable array logic, programmable logic devices, or the like.

"Neural network" refers to any logic, circuitry, component, chip, die, package, module, system, sub-system, or computing system configured to perform tasks by imitating biological neural networks of people or animals. Neural network, as used herein, may also be referred to as an artificial or deep neural network (DNN). Examples of neural networks that may be used with various embodiments of the disclosed solution include, but are not limited to, convolutional neural networks, feed forward neural networks, radial basis neural network, recurrent neural networks, modular neural networks, and the like. Certain neural networks may be designed for specific tasks such as object detection and/or image classification. Examples of neural networks suitable for object detection include, but are not limited to, Region-based Convolutional Neural Network (RCNN), Faster Region-based Convolutional Neural Network (Faster R-CNN), You Only Look Once (YOLO), and the like. Examples of neural networks suitable for image classification may include, but are not limited to, Googlenet Inception, Resnet, Mobilenet, Densenet and Efficientnet. A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like.

The neural network used with embodiments disclosed herein may employ one or more of a variety of learning models including, but not limited to, supervised learning, unsupervised learning, and reinforcement learning. These learning models may employ various backpropagation techniques.

Functions or other computer-based instructions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In some embodiments, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics, and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a video image data processing system 100 in accordance with an embodiment of the disclosure is shown. In many embodiments, it may be desired to monitor one or more visual areas by installing security cameras 150 within those areas. The security cameras 150 can generate a plurality of video image data (i.e., "video content") that can be processed. In a number of embodiments, the processing of the video image data will be configured to determine if one or more specific objects are within the monitored visual areas. In a number of embodiments, this detection may be presented as an inference map image from an object detection neural network which can be a segmentation or panoptic map. These maps can be utilized as a classification as to whether a specific object is present within the input data or not. These maps can be generated as an output from a neural network such as, but not limited to, a convolutional neural network (CNN). By way of example, and not limitation, video image data processing can be established to detect the presence of one or more pedestrians within the monitored visual areas. It will be understood by those skilled in the art that the video image data processing may be performed by processors internal to security cameras 150 or elsewhere in the system or in some combination thereof. The video image data processing may be implemented in software operating in conventional processors (e.g., CPU, MPU, GPU, RISC, etc.), and/or software operating in specifically purposed processors optimized to implement neural networks—or some combination thereof. In fact, the entire system may be considered a processor or a distributed processor.

Monitoring video content can be inefficient when done manually. Therefore, various embodiments attempt to minimize the amount of video content that needs to be manually reviewed by attempting to identify and/or determine if one or more specific objects within the video content and then trigger a notification for manual review. Often, the video image data processing system 100 will process the video image data within a centralized video processing server 110, although some embodiments may offload various processing tasks to other devices such as, but not limited to edge network devices 140 (like, for example, server farms, specialized AI hardware accelerators, online databases, etc.), servers 130, or internal to the security cameras 150 (themselves edge network devices). The video processing server 110 is often connected to a network 120 such as the Internet as depicted in FIG. 1. A plurality of security cameras 150 can also be attached to the network 120 such that they are communicatively coupled to the video processing server 110 comprising one or more processors like, for example, CPUs, MPUs, GPUs, etc. Although the embodiment of FIG. 1 depicts security cameras 150, it will be understood by those skilled in the art that any video image data capture device may be utilized as required by the desired application.

The security cameras 150 can be wired directly to the network 120 or may be wirelessly connected via one or more wireless access points 160. In this way, a variety of potential deployment arrangements may be realized to properly cover the desired areas for surveillance. In theory, there is no limit to the number of deployed security cameras 150 or other video image data capture devices that may be communicatively coupled with the video processing server 110. The limitations experienced may relate to the available bandwidth of the network 120 and computational resources of the video processing server 110. As discussed below, superior performance for system 100 is for the bulk of the processing to be done locally by security cameras 150 or other edge network devices 140 to minimize network traffic and reduce the need for centralized computing resources like video processing server 110 and servers 130.

Figure 2:
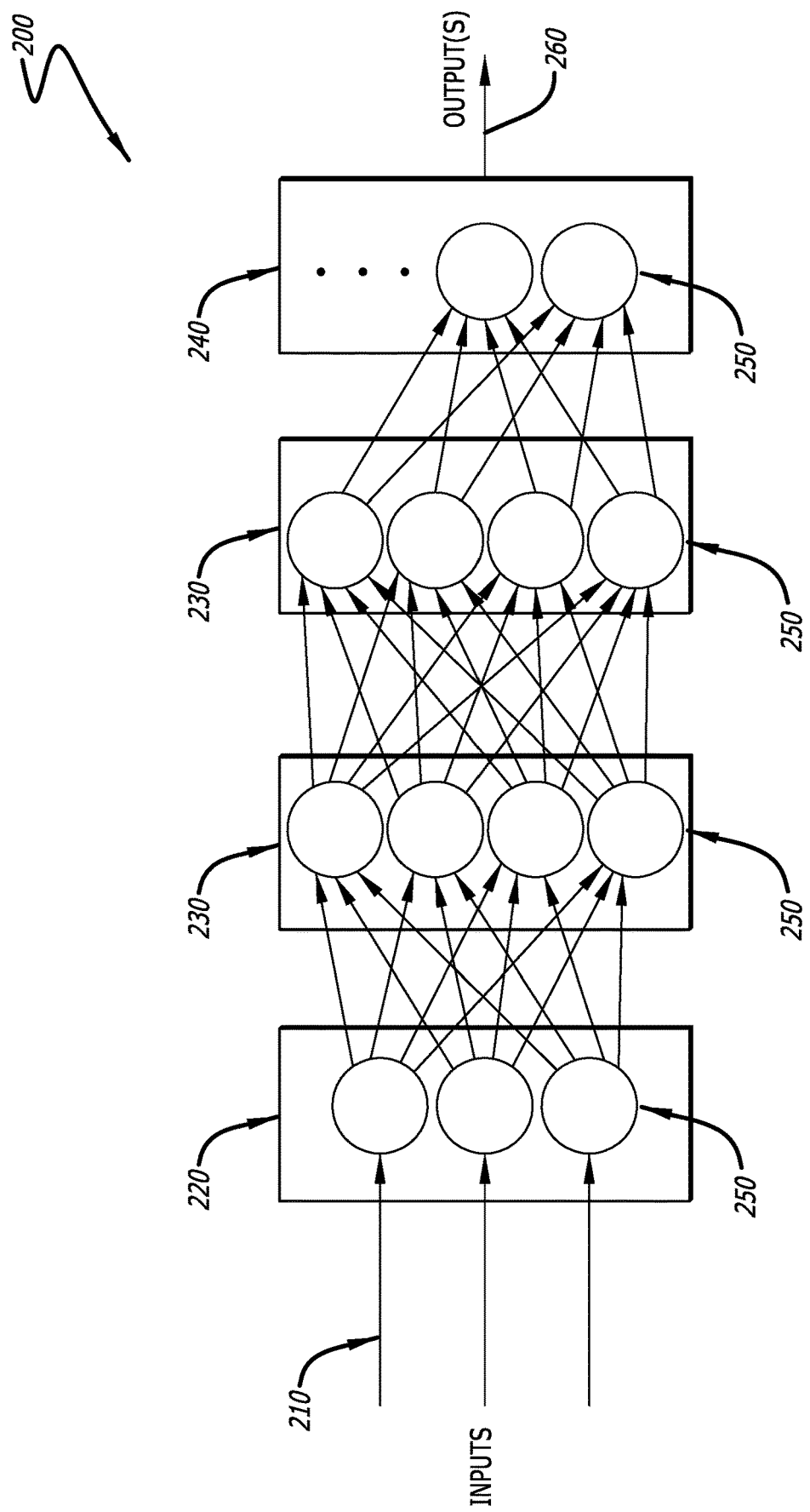
FIG. 2 is a conceptual illustration of an artificial neural network in accordance with an embodiment of the disclosure.

Referring to FIG. 2, a conceptual illustration of an artificial neural network 200 in accordance with an embodiment of the disclosure is shown. At a high level, the artificial neural network 200 comprises an input layer 220, one or more intermediate layers 230, and an output layer 240. The artificial neural network 200 comprises a collection of connected units or nodes called artificial neurons 250 which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the artificial neural network 200 depicted in FIG. 2 is shown as an illustrative example and various embodiments may comprise artificial neural networks that can accept more than one type of input and can provide more than one type of output.

In a typical embodiment, the signal at a connection between artificial neurons is a real number, and the output of each artificial neuron is computed by some non-linear function (called an activation function) of the sum of the artificial neuron's inputs 210. The connections between artificial neurons are called "edges" or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 220) to the last layer (the output layer 240), possibly after traversing one or more intermediate layers (also called hidden layers) 230.

The inputs to an artificial neural network may vary depending on the problem being addressed. In object detection, the inputs may be data representing pixel values for certain pixels within an image or frame. In one embodiment the artificial neural network 200 comprises a series of hidden layers in which each neuron is fully connected to neurons of the next layer. The artificial neural network 200 may utilize an activation function such as sigmoid, nonlinear, or a rectified linear unit (ReLU), upon the sum of the weighted inputs, for example. The last layer in the artificial neural network may implement a regression function such as SoftMax regression to produce the classified or predicted classifications output for object detection as output 260. In further embodiments, a sigmoid function can be used, and position prediction may need raw output transformation into linear and/or non-linear coordinates.

In certain embodiments, the artificial neural network 200 is trained prior to deployment and to conserve operational resources. However, some embodiments may utilize ongoing training of the artificial neural network 200 especially when operational resource constraints such as die area and performance are less critical.

Figure 3:
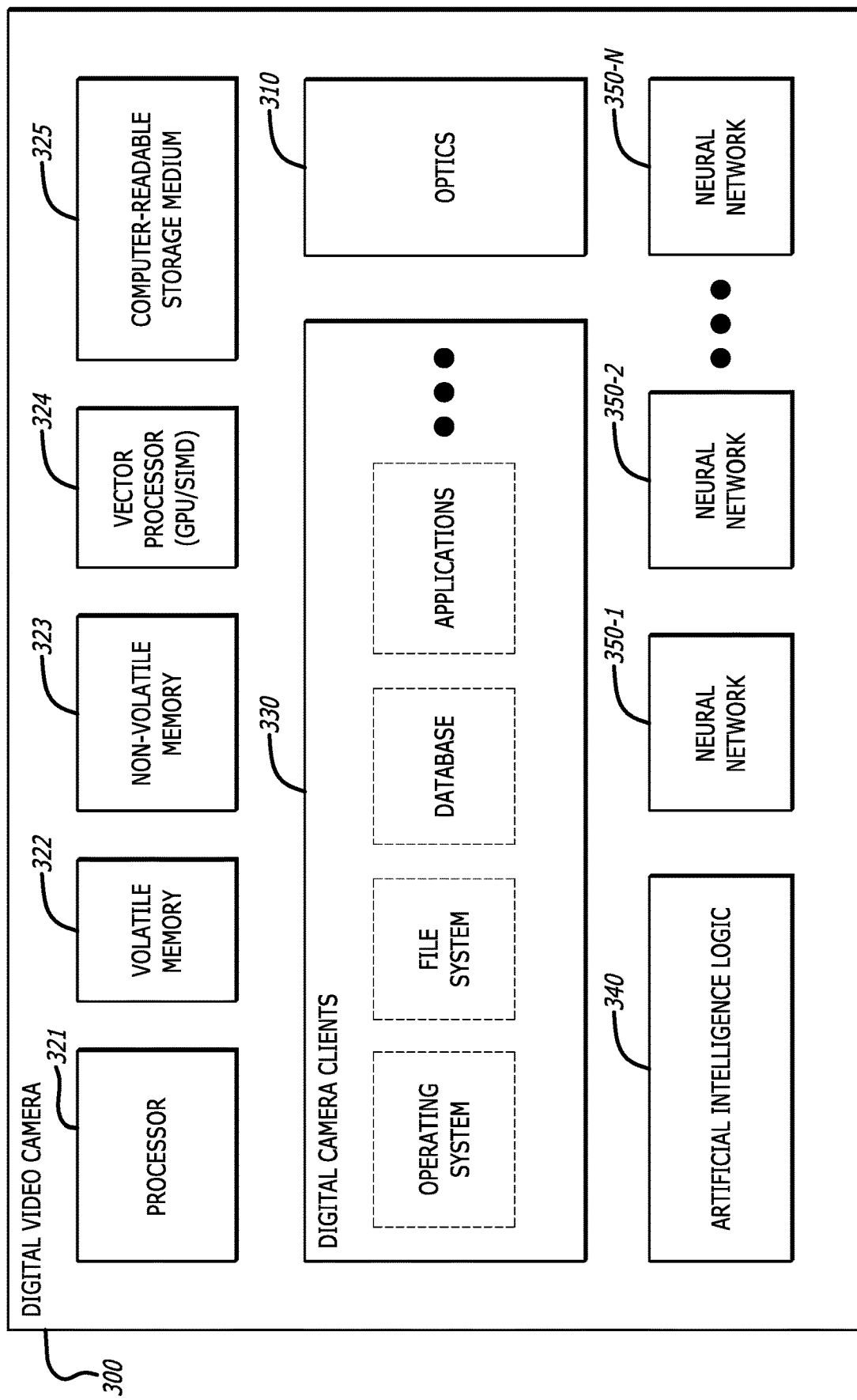
FIG. 3 is a schematic block diagram of a digital camera in accordance with an embodiment of the disclosure.

Referring to FIG. 3, a schematic block diagram of a digital camera in accordance with an embodiment of the disclosure is shown. Digital video camera 300 may comprise optics 310 which may further comprise the lenses (not shown), the image sensor used to capture images (not shown), and the support circuitry necessary for capturing successive frames of video data. Processor 321 may execute various control programs and applications such as digital camera clients 330. Such programs and applications may include an operating system, a file system, one or more databases, and a variety of applications, some of which may be artificial intelligence applications.

Volatile memory 322 may be used by processor 321 for code execution, scratch pad memory, temporary storage of video data, and the like. Non-volatile memory 323 may be used by processor 321 to store the programs, data, and various digital camera clients 330. It may also be used as mass storage for the video data captured by optics 310. Optional vector processor 324 may be used for high-speed parallel calculations. In some embodiments, vector processor 324 may be implemented as part of the artificial intelligence logic 340. Vector processor 324 may be a graphics processing unit (GPU) and/or have a single instruction/multiple data (SIMD) processor architecture and be capable of operating on very long data words like, for example, 128-bits, 256-bits, 512-bits, 1024-bit, or even more in some embodiments. Computer-readable storage medium 325 may be used by processor 321 for program storage, data, and other purposes.

Artificial intelligence logic 340 may be either a hardware function, a software function, or a combination thereof. It may be responsible for managing all artificial intelligence (AI) functions, controlling the artificial neural networks 350-1, 350-2 through 350-N and using them for various functions, image processing functions, updating the AI modeling, and the like. Artificial neural networks 350-1, 350-2 through 350-N may be neural networks of the sort described in conjunction with FIG. 2 above and may be implemented in both hardware and/or software.

Figure 4:
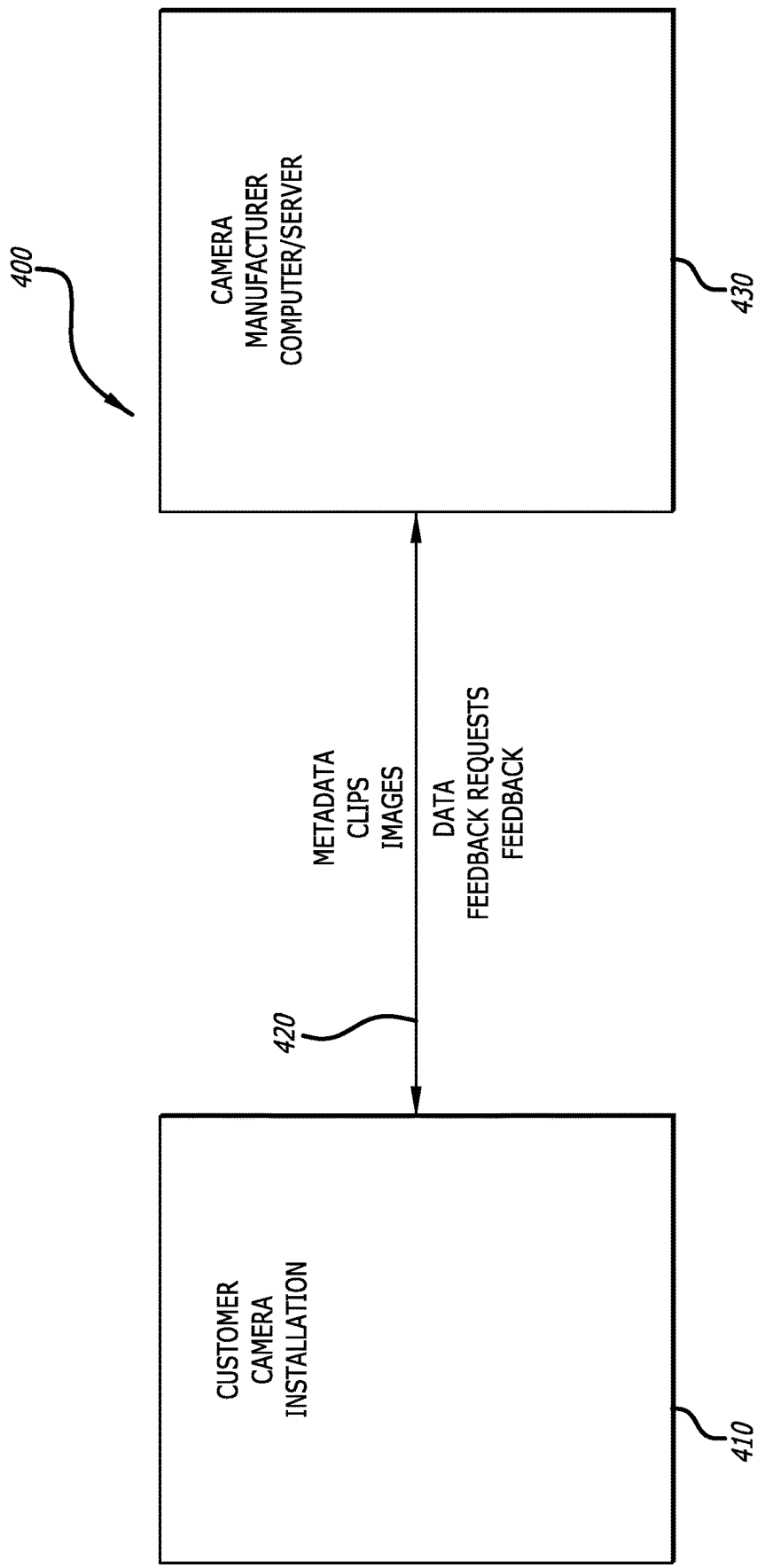
FIG. 4 is a schematic block diagram of a video processing and storage system in accordance with an embodiment of the disclosure.

Referring to FIG. 4, a schematic block diagram of a video processing and storage system 400 in accordance with an embodiment of the disclosure is shown. A customer camera installation 410 may comprise all of a customer's cameras. They may be coupled directly to a network 420 such as the Internet, or the cameras may be indirectly coupled to network 420 through a computer, a gateway, a server, or the like. Network 420 is used to transmit data back and forth between the camera installation and various remote computers and/or servers. Such data may be related to videos such as video clips, images and frames, metadata associated with the various clips, images, and frames, and the like. Requests for user feedback and the user feedback itself may also be transmitted back and forth as well as any other sort of data needed in the administration of the camera installation.

In some embodiments, the manufacturer of the cameras may also have one or more computers or servers 430 coupled to network 420. This is typically to enhance the customer's user experience with the camera installation by performing various tasks in the background with the customer's permission. Such tasks may include, for example, monitoring the functionality of the various cameras and creating service alerts or performing remote repairs, automatic updates to the camera software or firmware, assisting the customer with various aspects of managing their installed system, etc. In other embodiments, computers/servers 430 could represent the servers/computers of a service provider who receives data from the cameras and provides various services on the data including analytics and processing. In some instances, the service provider may not be the manufacturer of the cameras.

In particular, the cameras may be deployed with a particular AI model in the software and/or firmware and/or hardware configured, for example, to detect objects (cars, people, packages, etc.), track their motion, identify characteristics of the object (gender, size, color, etc., depending on the identified object), and the like. The model may be trained at the factory, deployed with the camera, and updated periodically during the lifetime of the camera. Typically, the model may consist of the coefficients for an artificial neural network like, for example, the one illustrated in FIG. 2. These may be determined by running a training data set of correctly annotated examples through the neural network. The neural network may compare the known correct result to the model output and "learns" by adjusting the coefficients to improve the accuracy of its outputs, in a process commonly known as "machine learning."

Over time, the quality of the model outputs may degrade. This may occur for a variety of reasons including, but not limited to, changes in traffic patterns, changes in the visual fields of the cameras, changes in time of day, changes of the seasons, etc. To keep the accuracy of the model's outputs high, periodic retraining may be needed. It may be desirable to include new annotated examples from a wide distribution of cameras surveilling a large variety of visual fields and target objects and/or characteristics to the training data set. This may be done by utilizing real annotated examples from the video logs of the cameras deployed in the field. However, this may involve hundreds of hours of video stored on thousands of cameras in dozens or even hundreds of installations. Since human annotation may be needed for the annotated examples in the annotated training set, it may be difficult and/or impossible for humans to manually review all of that data looking for appropriate annotated examples to annotate. The process may be simplified by limiting the annotated examples to cases that the model has had difficulties in making correct identifications. This may reduce the number of potential candidates for new annotated examples.

The feedback and training may be implemented in other ways. In other embodiments, the digital video cameras may be owned and/or operated by, for example, a service company to provide the surveillance for the customer. There may be one or more service company computers or servers coupled to network 420 (not shown). In such an arrangement, the service company may choose to oversee the feedback and training process internally and separately from the manufacturer. In alternate embodiments, the customer may play the role of the service company and not only own and operate the cameras, but also perform their own feedback and training process. In such embodiments, there will be customer computers and servers (not shown) as part of the customer camera installation 410. Persons skilled in the art will also realize there are other such embodiments and/or hybrid embodiments that all fall within the scope of the invention.

Figure 5:
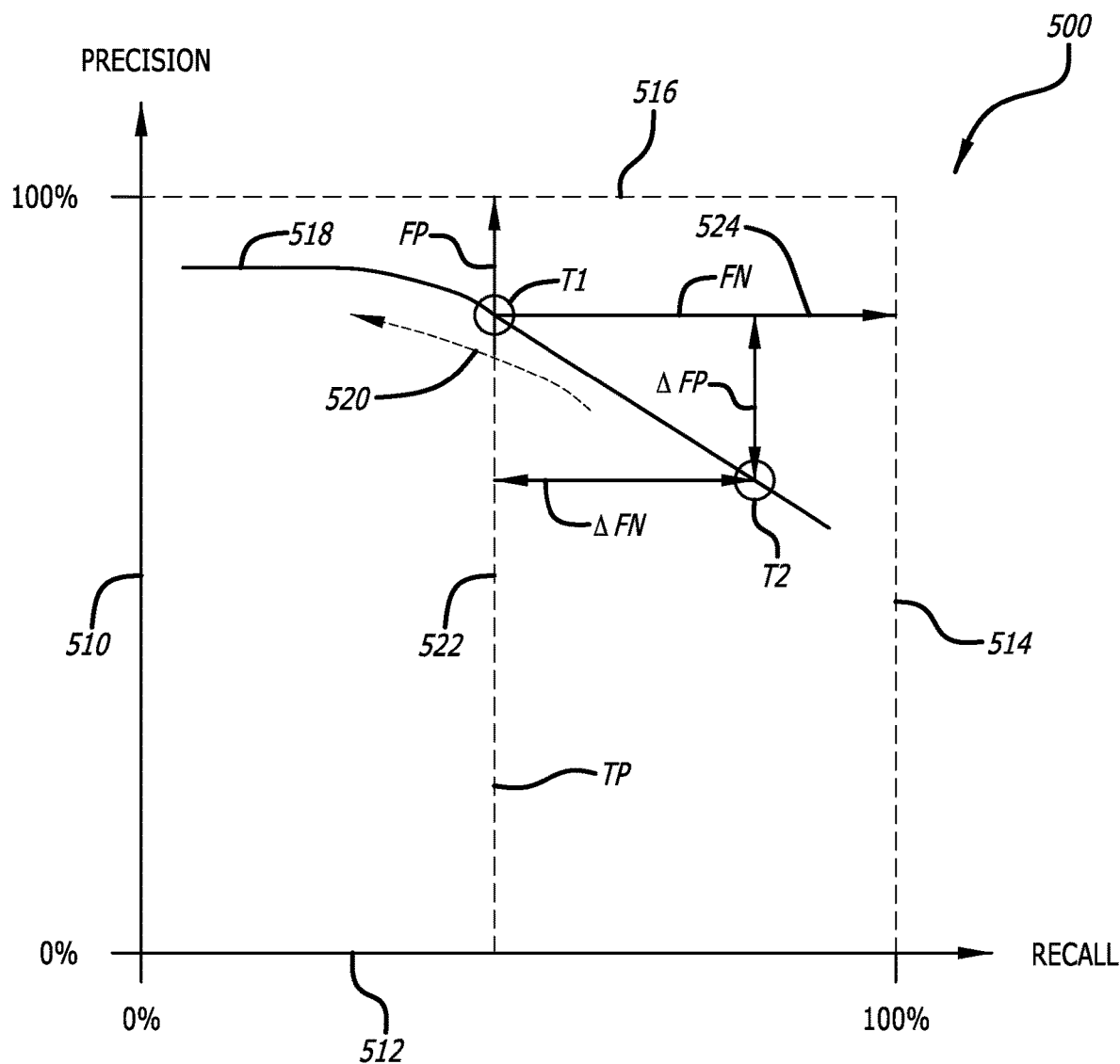
FIG. 5 is a graph of a Precision and Recall (PR) curve in accordance with an embodiment of the disclosure.

Referring to FIG. 5, a graph of a Precision/Recall (PR) curve for the object detection task in accordance with an embodiment of the disclosure is shown. The graph 500 comprises a vertical Precision-axis 510 and a horizontal Recall-axis 512. Both axes range from 0% to 100%. The dashed lines 514 and 516 along with the axes form an extent box for the PR curve 518. In general, precision may be a measure of the accuracy of a model's predictions while recall may be a measure of its sensitivity. Typically, the curve may represent the increasing of the confidence threshold while moving to the left on PR curve 518 (and as indicated by the curved dashed arrow 520).

Also shown in FIG. 5 is confidence threshold point T1 (at the center of the labeled circle). This may be considered a figure of merit for a particular model. The solid vertical arrow (labeled FP) may indicate the portion of False Positives (FP) returned by the current model at T1. The portion of True Positives (TP) returned by the current model may be indicated by vertical dashed line 522 (also labeled TP). Vertical dashed line 522 is an extension of the FP arrow down to the recall-axis.

As the PR curve 518 moves to the left, the number of FPs decreases while the number of false negatives 524 (also labeled FN) increases. A FN my occur when an object is actually present, and the model does not correctly detect it. Thus, there may be a tradeoff to be made in choosing the right value for T1.

An object detection module may output such values as class (person, animal, car, etc.), bounding box (the location and extents of the object in a frame), and a confidence score (typically a percentage). T1 may be chosen to be the confidence score value that delineates an optimal balance between correct detections (true positives) and false alarms (false positives—or objects detected and not actually present). In order to improve the model, the best candidates to become annotated examples may be objects with confidence scores very near to T1. These are cases that may be the most difficult because they are on the boundary between TPs and FPs.

For choosing annotated example candidates, a second confidence threshold T2 may be defined at a distance from T1. The distance between T1 and T2 increases the number of false positives by ΔFP (represented by the vertical arrow so labeled) and decreases the number of false negatives by ΔFN (represented by the horizontal arrow so labeled). Detected objects that have a confidence score between T1 and T2 become the pool of annotated example candidates. The actual values of T1 and T2 are a matter of design choice.

Figure 6:
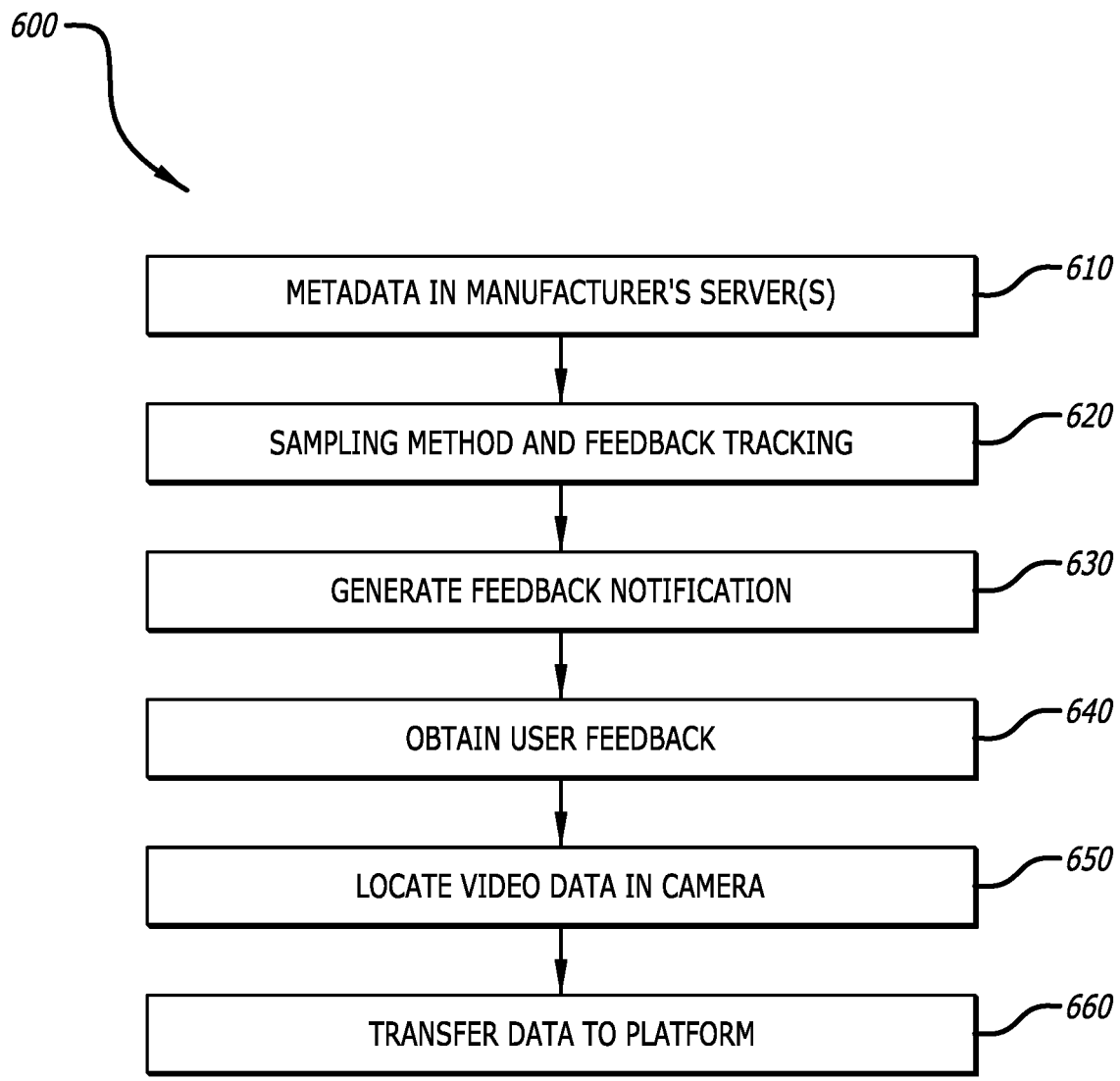
FIG. 6 is a flowchart of a process of data collection and requesting user feedback in accordance with an embodiment of the disclosure.

Referring to FIG. 6, a flowchart of a process 600 of data collection and requesting user feedback in accordance with an embodiment of the disclosure is shown. In some embodiments, process 600 may begin with the necessary metadata already downloaded from installed cameras stored on the camera manufacturer's computers and/or servers (block 610). In other embodiments, the digital video cameras may be owned and/or operated by, for example, a service company to provide the surveillance for the customer. There may be one or more service company computers or servers coupled to the customer's camera installation via a network or the Internet where the metadata may be downloaded. In such an arrangement, the service company may choose to oversee the feedback and training process internally and separately from the manufacturer. In some alternative embodiments, the customer may play the role of the service company and not only own and operate the camera installation, but also perform their own feedback and training process. In such embodiments, there will be customer computers and servers as part of the customer camera installation where the metadata may be downloaded. Persons skilled in the art will realize there are other such arrangements and/or hybrid arrangements that all fall within the scope of the invention.

This metadata may include information about the camera installations, locations, the sort of video data archived internal to the camera itself, AI model outputs, etc., and may be used to perform the sampling method and feedback tracking (block 620). The sampling method may determine the false positive and false negative candidates while the feedback tracking may determine which candidates are presented for annotation to a user or some other person and when.

A request and/or notification for a candidate for annotation may be presented, and a notification to the user to annotate the candidate may then be sent (block 630). To streamline the process for the user, a simple dialog box may be sent with a picture of the frame overlaid with the candidate's bounding box. In the case of a FP request, the dialog box might read, "Click 'NO OBJECT' if there is no object in this alert," and a single response button saying, "NO OBJECT." In the case of a FN request, the dialog box might read, "Click 'OBJECT' if there is an object in this alert," and a single response button saying, "OBJECT."

The user may respond to the notification and the results of the feedback annotations may be collected in the manufacturer's servers (block 640). The associated image or images may be retrieved from the camera (block 650) and transferred to the manufacturers servers where they may be paired up with the annotation and may be added to the training set (block 660).

Figure 7:
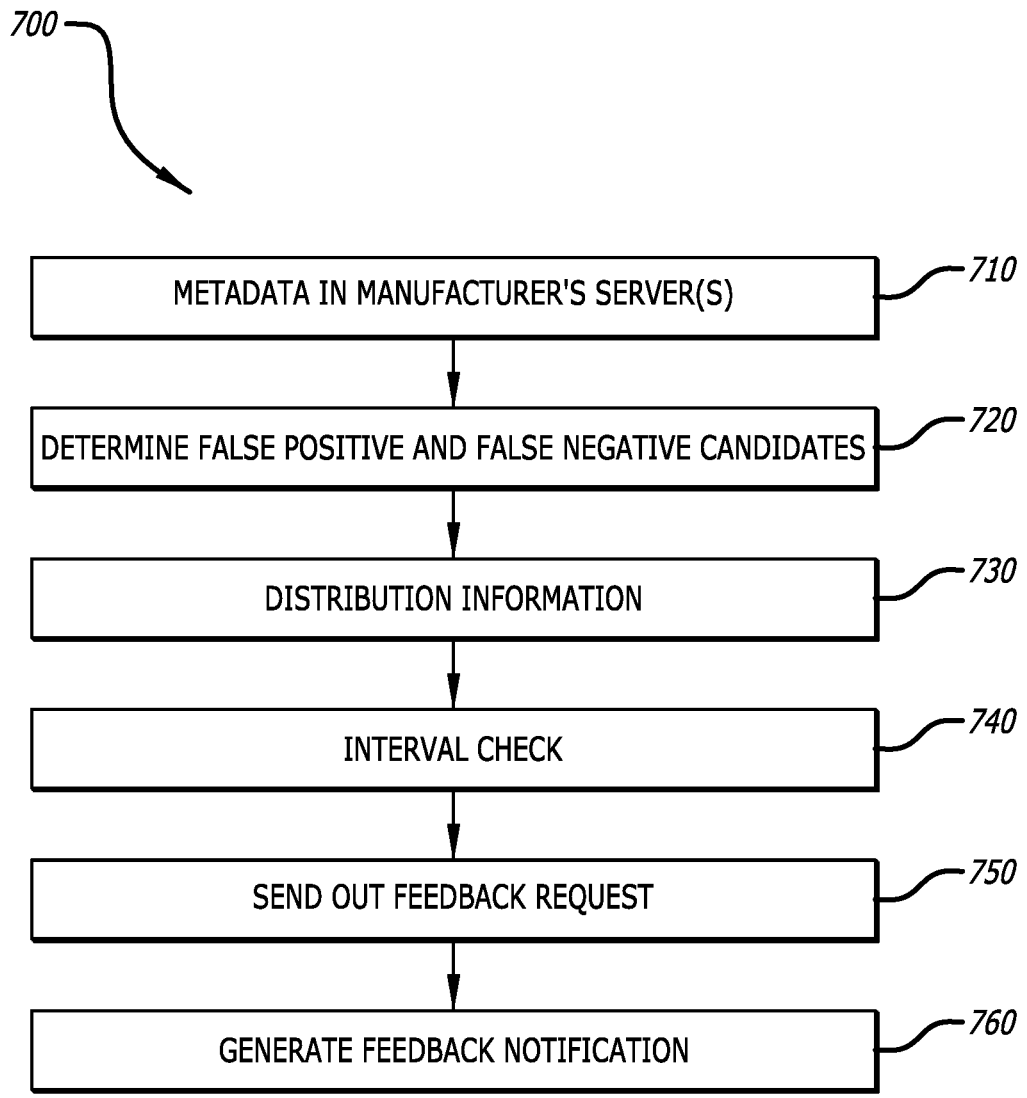
FIG. 7 is a flowchart of a process of data collection and requesting user feedback in accordance with an embodiment of the disclosure.

Referring to FIG. 7, a flowchart of a process 700 of data collection and requesting user feedback in accordance with an embodiment of the disclosure is shown. In some embodiments, process 700 may begin with the necessary metadata already downloaded from installed cameras and stored on the camera manufacturer's servers (block 710). In other embodiments, the digital video cameras may be owned and/or operated by, for example, a service company to provide the surveillance for the customer. There may be one or more service company computers or servers coupled to the customer's camera installation via a network or the Internet where the metadata may be downloaded. In such an arrangement, the service company may choose to oversee the feedback and training process internally and separately from the manufacturer. In some alternative embodiments, the customer may play the role of the service company and not only own and operate the camera installation, but also perform their own feedback and training process. In such embodiments, there will be customer computers and servers as part of the customer camera installation where the metadata may be downloaded. Persons skilled in the art will realize there are other such arrangements and/or hybrid arrangements that all fall within the scope of the invention.

This metadata may include information about the camera installations, locations, the sort of video data archived internal to the camera itself, AI model outputs, etc., and may be used to perform the sampling method and feedback tracking.

A search and analysis may be performed to determine false positive and false negative candidates (block 720). Once the FP and FN candidates have been identified, a distribution analysis may be performed to ensure that the candidates that become annotated examples are selected from a broad base of all the installed cameras that participate in the process (block 730). This may produce a smaller but most robust set of new annotated examples because of the exposure to a wider range of locations, objects, characteristics, etc.

Soliciting user feedback may be difficult. Too many feedback requests may annoy the user and detract from the user experience. Similarly, too few requests may delay the deployment of new versions of the models which may produce inferior results from the user's camera installation which may also detract from the user experience. There may be a need to balance these factors. In some embodiments, an interval analysis may be performed on a log of previous feedback requests from the cameras that generated the FP and FN candidates (block 740). If it has been longer than a specified interval that may be determined by the manufacturer, a service company, or the user, a feedback request may be generated and/or sent out (block 750). A user feedback notification may be generated and/or sent based on the feedback request, either to the camera associated with the request or a server monitoring that camera (block 760).

Figure 8:
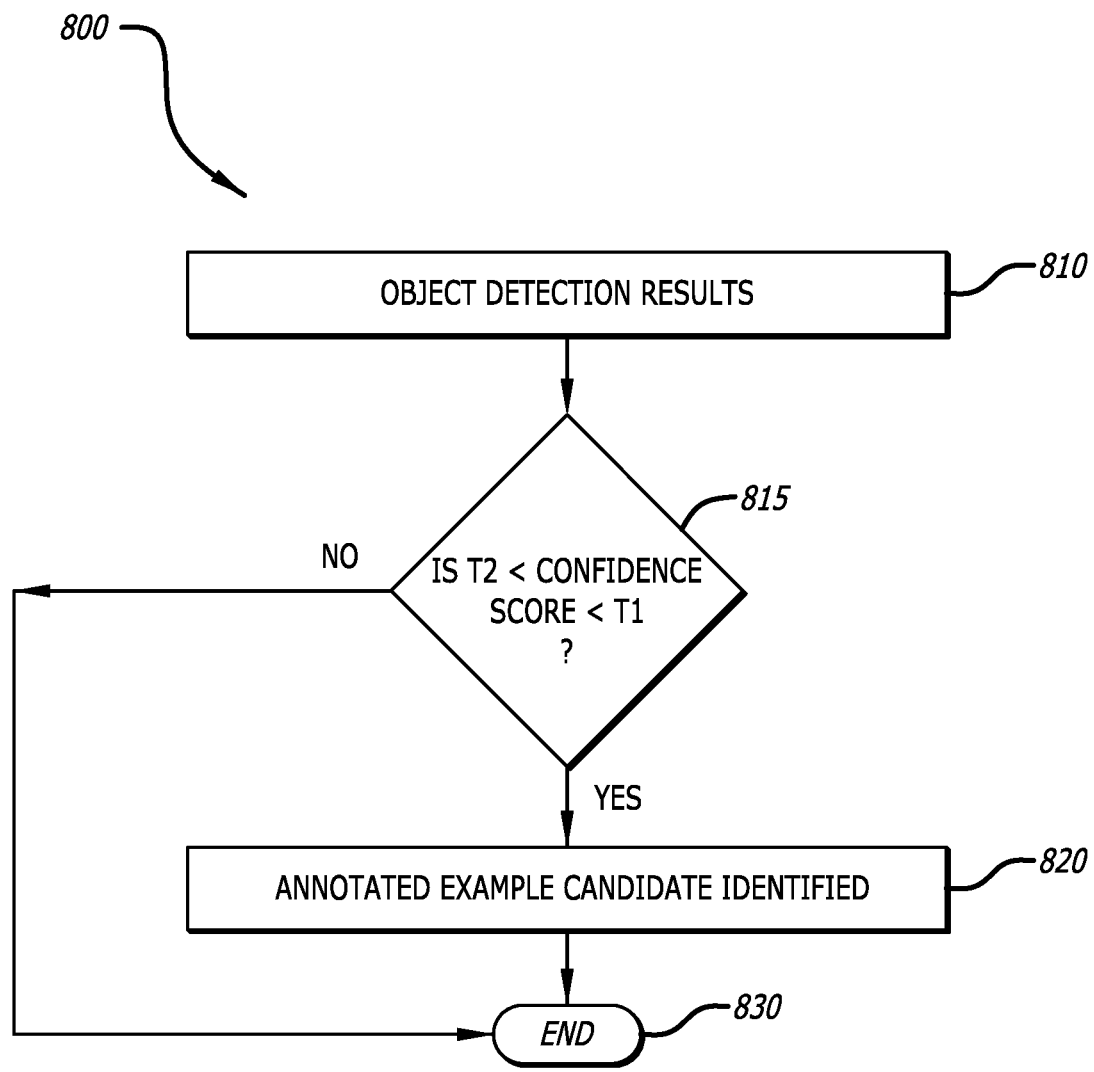
FIG. 8 is a flowchart of a process for automatically determining False Positive (FP) and False Negative (FN) candidates in accordance with an embodiment of the disclosure.

Referring to FIG. 8, a flowchart of a process 800 for automatically determining False Positive (FP) and False Negative (FN) candidates in accordance with an embodiment of the disclosure is shown. Process 800 may begin by performing an analysis of object detection results (block 810). This analysis may be performed in the installed camera base and/or in the camera manufacturer's servers.

An object detection result may include the class of an object, its bounding box, its motion, and a confidence score. The currently deployed model will have a confidence threshold point (referred to as T1) on the PR curve that differentiates between true positives and false positives based on the confidence score. A second confidence threshold (referred to as T2) may also be defined for purposes of training at a different and lower confidence point on the PR curve. This may identify candidate objects that were originally true positives under T1 but were hard for the model to determine. It may be determined if:

$$T1 > \text{Object's Confidence Score} > T2 \quad \text{(block 815)}$$

If not, the object may not be a candidate, and no further processing may be required (block 830). If so, then the object may be identified as an annotated example candidate (block 820).

Figure 9A:
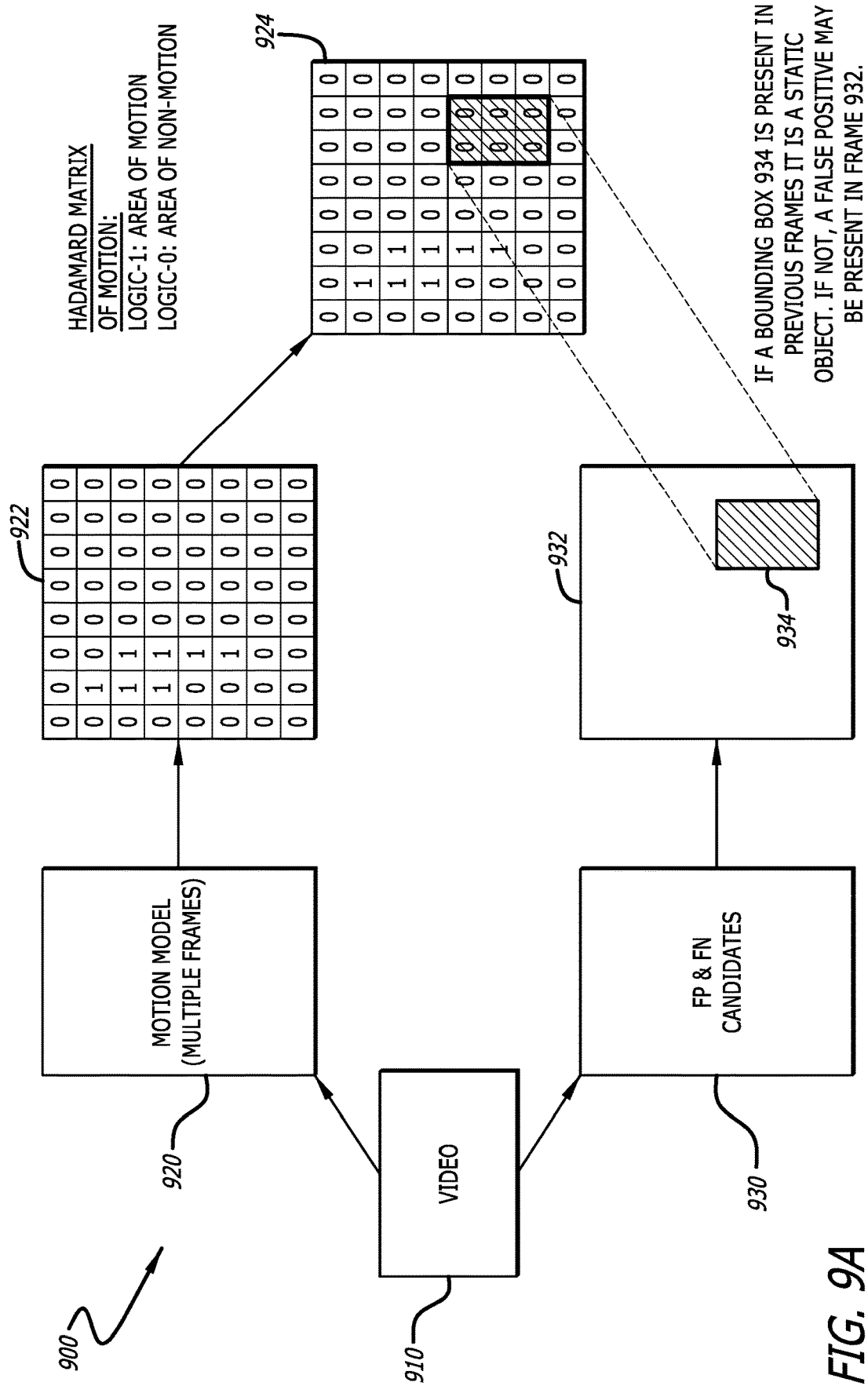
FIG. 9A is a conceptual diagram of a process for automatically determining False Positive (FP) candidates in accordance with an embodiment of the disclosure.

Referring to FIG. 9A, a conceptual diagram of a process for automatically determining False Positive (FP) candidates in accordance with an embodiment of the disclosure is shown. Diagram 900 may comprise video data 910 that may be analyzed for motion by the motion model 920 and be filtered to determine FP and FN candidate objects by the candidate model 930.

The motion model 920 may be part of the object detection model deployed with installed digital video cameras. Motion model 920 may compare multiple neighboring frames in a video sequence and may use differences between two or more successive neighboring frames to track the motion of detected objects. An output of motion model 920 may be a Hadamard matrix of motion 922 where a logic-1 may represent an area of motion and a logic-0 may represent an area of non-motion. These areas of motion and non-motion may represent a single pixel or a group of pixels.

An output of candidate model 930 may be a single video frame 932 with a bounding box 934 which may indicate the presence and extent of a FP candidate object in frame 932. The frame 932 may be overlaid upon the Hadamard matrix 922 to form a comparison frame 924. In this case, the bounding box 934 falls in an area of substantially non-motion (designated by all logic-0 values inside of bounding box 934). One or more previous or subsequent neighboring frames may be analyzed for the presence of bounding box 934. If the bounding box 934 is present in the previous or subsequent neighboring frame or frames, that means the bounding box 934 may represent a static object and may represent a correctly identified object (or True Positive). Finding an object identified at the same location in multiple neighboring frames prior or subsequent to frame 932 that is also present at the location of bounding box 934 in frame 932 is to be expected if an object is truly there. Thus, if the bounding box 934 is not present in the previous or subsequent frame or frames, the appearance of bounding box 934 in frame 932 may be unexpected and thus may be a possible false positive because an object may not actually be at that location. In this latter case, frame 932 is retained for annotation as a FP candidate.

Figure 9B:
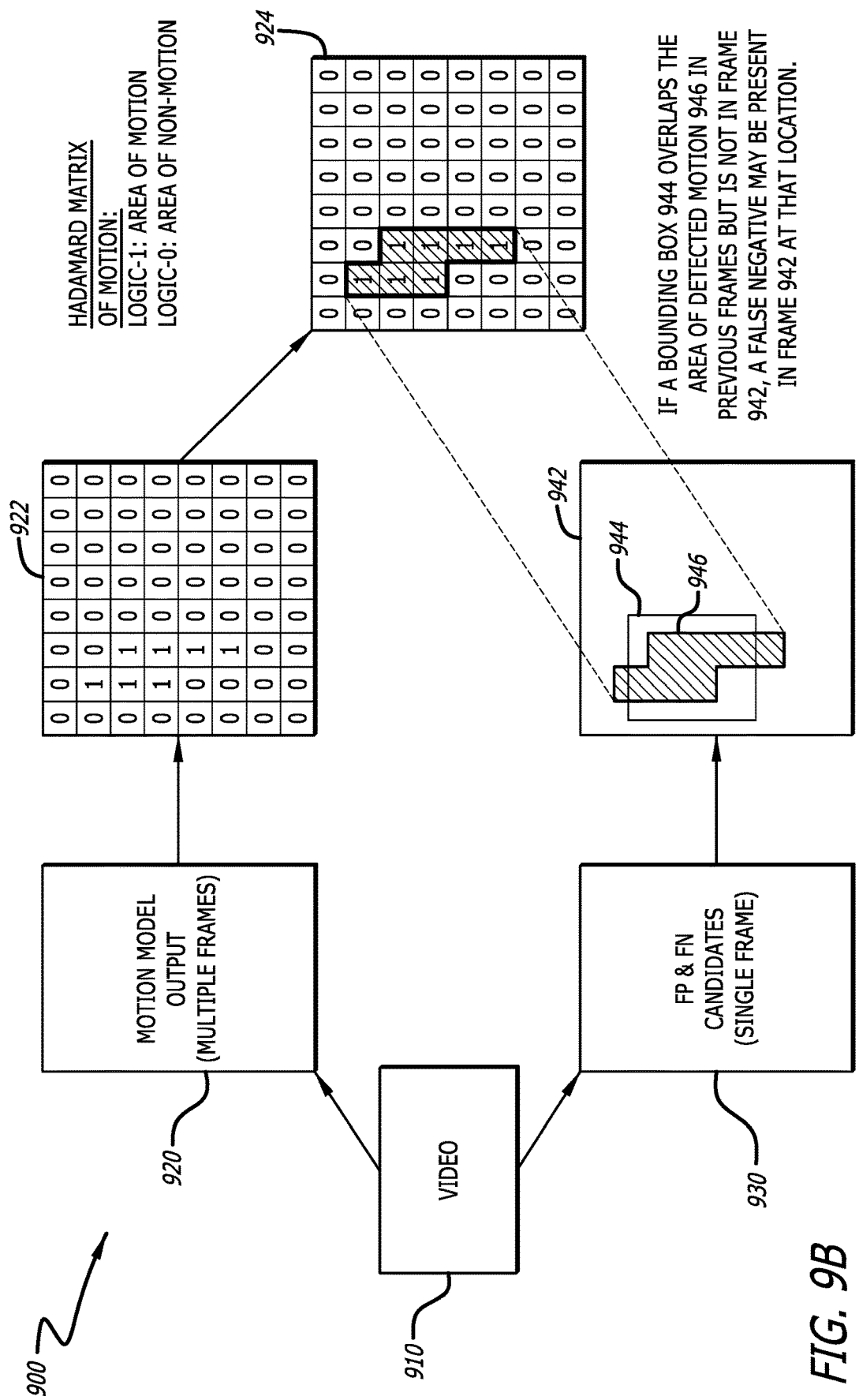
FIG. 9B is a conceptual diagram of a process for automatically determining False Negative (FN) candidates in accordance with an embodiment of the disclosure.

Referring to FIG. 9B, a conceptual diagram of a process for automatically determining False Negative (FN) candidates in accordance with an embodiment of the disclosure is shown. FIG. 9B is nearly identical to FIG. 9A. Frame 932 and bounding box 934 have been removed, while a frame 942 with a bounding box 944 and an area of motion 946 have been added. The area of motion 946 (an area with a preponderance of logic-1s in comparison frame 924) may not be present in frame 942, and its presence in the figure may be to illustrate its relative physical location relative to frame 942 and bounding box 944.

Bounding box 944 may be detected in frame 942, while an area of motion 946 may absent but be detected in one or more previous or subsequent neighboring frames. In this example, the bounding box 944 may substantially overlap the area of motion 946. If an object in the area of motion 946 is not detected in frame 942 but is present in previous or subsequent neighboring frames where bounding box 944 is absent, a false negative candidate may be present. Finding area of motion 946 in frame 942 without a moving object present is unexpected, since an object may be present that was not correctly identified by the model. In this case, frame 942 is retained for annotation as a FN candidate.

Figure 10:
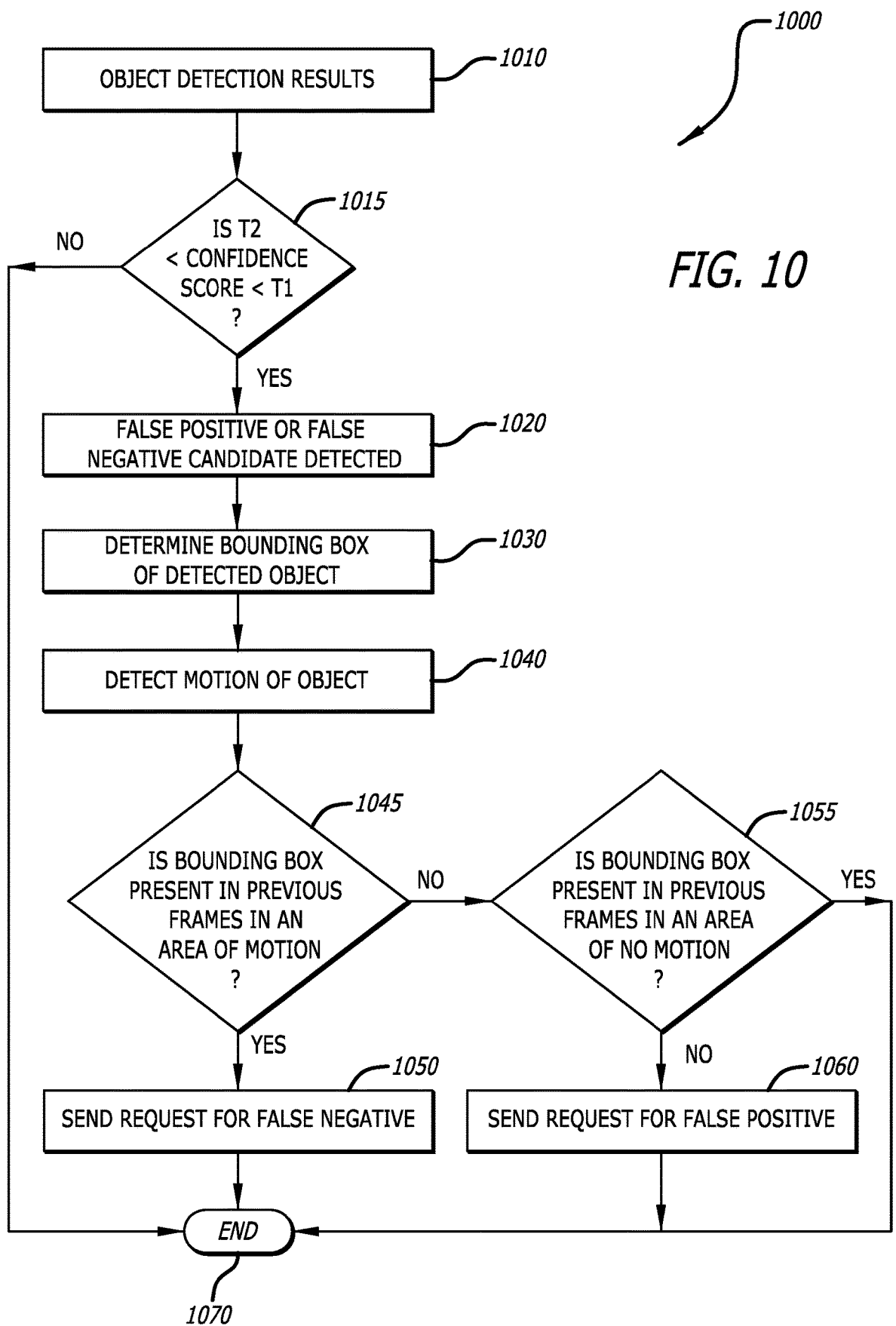
FIG. 10 is a flowchart of a process for automatically determining False Positive (FP) and False Negative (FN) candidates in accordance with an embodiment of the disclosure.

Referring to FIG. 10, a flowchart of a process 1000 for automatically determining False Negative (FN) candidates in accordance with an embodiment of the disclosure is shown. Process 1000 may begin by performing an analysis of object detection results (block 1010). This analysis may be performed in the installed camera base and/or in the camera manufacturer's servers.

An object detection result may include the class of an object, its bounding box, one or more of its characteristics, its motion, and a confidence score. The currently deployed model will have a confidence threshold point (referred to as T1) on the PR curve that differentiates between true positives and false positives based on the confidence score. A second confidence threshold (referred to as T2) may also be defined for purposes of training at a different and lower confidence point on the PR curve. This may identify candidate objects that were originally true positives under T1 but were hard for the model to determine. It may be determined if:

$$T1 > \text{Object's Confidence Score} > T2 \qquad \text{(block 1015)}$$

If not, the object may not be a candidate, and no further processing may be required (block 1070). If so, then the object may be identified as either a false positive or false negative candidate (block 1020). The bounding box of the object may be determined (block 1030), the bounding box being the location and extents of the object. A motion model may be used to determine the motion of the object (block 1040).

A determination may be made if the object's bounding box is present in previous frames in an area of motion (block 1045). If so, a request for a false negative is sent (block 1050) and no further processing is required (block 1070). If so, a determination may be made if the object's bounding box is present in previous frames in an area of non-motion (block 1055). If not, a request for a false positive is sent (block 1060) and no further processing is required (block 1070). If so, then no further processing is required (block 1070).

Figure 11:
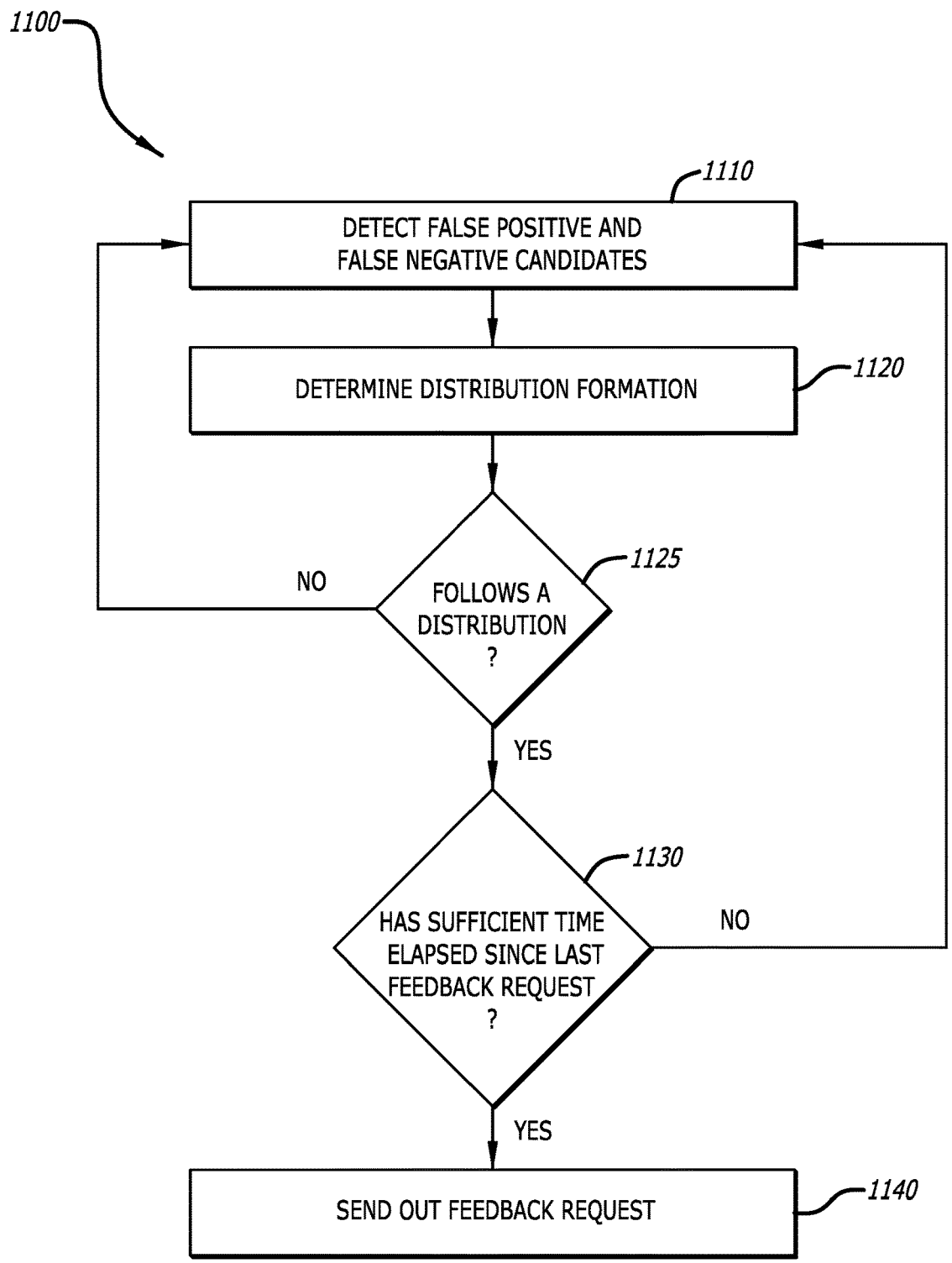
FIG. 11 is a flowchart of a process for automatically determining the presentation of False Positive (FP) and False Negative (FN) candidates to a user in accordance with an embodiment of the disclosure.

Referring to FIG. 11, a flowchart of a process 1100 for automatically determining the presentation of False Positive (FP) and False Negative (FN) candidates to a user in accordance with an embodiment of the disclosure is shown. Process 1100 may begin with the detection of some number of false positive and false negative candidates (block 1110). An analysis may be performed to determine the distribution formation of the candidates (block 1120). It may be desirable to have a high level of diversity in the FP and FN candidates submitted for annotation. Ideally, the candidates would be taken from thousands of cameras in hundreds of installations all coupled to the camera manufacturer's servers. A diversity of annotated candidates may make for more robust training of the next generation model.

In the case of a particular FP or FN candidate, a determination is made if the candidate follows the distribution (block 1125). If not, no feedback request is needed, and the process can return to detecting false positive and false negative candidates (block 1110). If so, a determination is made if a sufficient time has elapsed since the last feedback request for that camera or installation (block 1130). If not, no feedback request is needed, and the process similarly goes back to detecting false positive and false negative candidates (block 1110). If so, a feedback request is sent (block 1140).

Information as herein shown and described in detail is fully capable of attaining the presently described embodiments of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
an artificial intelligence logic configured to:
identify candidate objects according to a first confidence threshold and a second confidence threshold, wherein a true positive candidate object and a false positive candidate object are differentiated based on a confidence score;
track a motion of the candidate objects within a visual field, wherein each candidate object comprises a bounding box defining its location in the visual field;
separate the candidate objects into false positive candidate objects and false negative candidate objects according to their tracked motions, wherein the separating comprises:
separating a candidate object as a false positive candidate object in response to the bounding box of a candidate object occurring within an area of non-motion designated by the presence of a single logic value associated with non-motion within the bounding box; and
separating a candidate object as a false negative candidate object in response to the bounding box of the candidate object occurring within an area of motion designated by the presence of a single logic value associated with motion within the bounding box, wherein a relative physical location of the area of motion is illustrated relative to the bounding box; and
present at least a portion of the false positive candidate objects and false negative candidate objects for further annotation, wherein the presenting comprises sending a request to annotate a false negative candidate object that has been separated in response to determining that the object's bounding box is present in one or more previous frames in an area of motion.

2. The device of claim 1, wherein:
the visual field is partitioned into areas of motion and areas of non-motion.

3. The device of claim 2, wherein the areas of motion and the areas of non-motion are partitioned according to a Hadamard matrix.

4. The device of claim 1, wherein if a defined time interval has passed since either a false positive candidate object or a false negative candidate object has been presented for further annotation, then another false positive candidate object or false negative candidate object is presented for further annotation.

5. The device of claim 4, wherein the device is a video camera.

6. The device of claim 1, wherein the device is a video camera.

7. The device of claim 1, wherein the artificial intelligence logic is configured with artificial neural networks to identify objects and track the motion of objects.

8. A system, comprising:
a plurality of installations, wherein:
each installation comprises a plurality of video cameras; and
each video camera comprises:
an artificial intelligence logic configured to:
identify candidate objects according to a first confidence threshold and a second confidence threshold, wherein a true positive candidate object and a false positive candidate object are differentiated based on a confidence score;
track a motion of the candidate objects within a visual field, wherein each candidate object comprises a bounding box defining its location in the visual field;
separate the candidate objects into false positive candidate objects and false negative candidate objects according to their tracked motions, wherein the separating comprises:
separating a candidate object as a false positive candidate object in response to the bounding box of a candidate object occurring within an area of non-motion designated by the presence of a single logic value associated with non-motion within the bounding box; and
separating a candidate object as a false negative candidate object in response to the bounding box of the candidate object occurring within an area of motion designated by the presence of a single logic value associated with motion within the bounding box, wherein a relative physical location of the area of motion is illustrated relative to the bounding box; and
present at least a portion of the false positive candidate objects and false negative candidate objects for further annotation, wherein the presenting comprises sending a request to annotate a false negative candidate object that has been separated in response to determining that the object's bounding box is present in one or more previous frames in an area of motion.

9. The system of claim 8, wherein the visual field is partitioned into areas of motion and areas of non-motion.

10. The system of claim 9, wherein:
the false positive candidate objects and the false negative candidate objects are analyzed according to a physical distribution of the video cameras; and
the false positive candidate objects and the false negative candidate objects are selected for further annotation according to the physical distribution of the video cameras.

11. The system of claim 10, wherein if a defined time interval has passed since either a false positive candidate object or a false negative candidate object has been selected for presentation for further annotation from the same video camera, then another selected false positive candidate object or false negative candidate object from that camera is presented for further annotation.

12. The system of claim 11, wherein a separated false positive candidate object or a separated false negative candidate object is presented for human annotation on a computer.

13. The system of claim 11, further comprising:
a first computer; and
a second computer coupled between at least one of the video cameras and the first computer;
wherein a separated false positive candidate object or a separated false negative candidate object is presented for human annotation on the second computer.

14. A method of collecting training examples for updating an object identification and motion tracking model, the method comprising:
identifying candidate objects according to a first confidence threshold and a second confidence threshold, wherein a true positive candidate object and a false positive candidate object are differentiated based on a confidence score;
tracking a motion of the candidate objects within a visual field, wherein each candidate object comprises a bounding box defining its location in the visual field;
separating the candidate objects into false positive candidate objects and false negative candidate objects according to their tracked motions, wherein the separating comprises:
separating a candidate object as a false positive candidate object in response to the bounding box of a candidate object occurring within an area of non-motion designated by the presence of a single logic value associated with non-motion within the bounding box; and
separating a candidate object as a false negative candidate object in response to the bounding box of the candidate object occurring within an area of motion designated by the presence of a single logic value associated with motion within the bounding box, wherein a relative physical location of the area of motion is illustrated relative to the bounding box; and
presenting at least a portion of the false positive candidate objects and false negative candidate objects for further annotation, wherein the presenting comprises sending a request to annotate a false negative candidate object that has been separated in response to determining that the object's bounding box is present in one or more previous frames in an area of motion.

15. The method of claim 14, wherein the visual field is partitioned into areas of motion and areas of non-motion.

16. The method of claim 15, wherein the areas of motion and the areas of non-motion are partitioned according to a Hadamard matrix.

17. The method of claim 14, wherein:
the false positive candidate objects and the false negative candidate objects are analyzed according to a distribution of a plurality of video cameras; and
the false positive candidate objects and the false negative candidate objects are selected for further annotation according to the distribution of the plurality of video cameras.

18. The method of claim 17, wherein if a defined time interval has passed since either a false positive candidate object or a false negative candidate object has been presented for further annotation, then another false positive candidate object or false negative candidate object is presented for further annotation.

19. The method of claim 14, wherein the presenting at least a portion of the false positive candidate objects and false negative candidate objects for further annotation further comprises performing a distribution formation analysis.

20. The method of claim 19, further comprising, in response to the at least a portion of the false positive candidate objects and false negative candidate objects following a distribution, requesting feedback.

* * * * *